United States Patent

[11] 3,607,361

| | | |
|---|---|---|
| [72] | Inventor | Hanford Z. Hight<br>Short Hills, N.J. |
| [21] | Appl. No. | 784,507 |
| [22] | Filed | Nov. 15, 1968 |
| [45] | Patented | Sept. 21, 1971 |
| [73] | Assignee | Bonded/Products, Inc.<br>South Orange, N.J. |

[54] BALLOON BACKING FOR PIPE LINING
5 Claims, 4 Drawing Figs.

[52] U.S. Cl. .................................... 117/95,
117/161, 118/408, 138/97
[51] Int. Cl. ........................................ B05c 8/02,
B05c 8/00
[50] Field of Search .......................... 117/94, 95,
97; 118/408; 138/97

[56] References Cited
UNITED STATES PATENTS

| 2,106,004 | 1/1938 | Inglee | 204/5 |
|---|---|---|---|
| 3,041,204 | 1/1962 | Green | 117/97 |
| 3,125,464 | 3/1964 | Harmes | 118/408 X |
| 3,211,574 | 10/1965 | Shannon | 117/97 |

*Primary Examiner*—Alfred L. Leavitt
*Assistant Examiner*—Edward G. Whitby
*Attorney*—Richard S. Shreve, Jr.

ABSTRACT: Balloon inserted through gas pipe, inflated in gas main beyond angle fitting, deflated and withdrawn thereinto, reinflated and lining material charged thereagainst at greater pressure. Pressure indicated on outside gauge verifies position of balloon.

PATENTED SEP 21 1971 3,607,361

INVENTOR
HANFORD Z. HIGHT

BY Richard S. Shreve, Jr.

ATTORNEY

BALLOON BACKING FOR PIPE LINING

BACKGROUND

The Shannon Pat. No. 3,211,574 operated to jiggle through the pipe a solid ball so that it was in position in the fitting, and then propelled the lining material out of the cartridge to plug the fitting. This ball merely rested in position there and was of necessity of smaller diameter than the openings through the fittings. Hence in operation it was difficult to completely coat the top of the fittings on the inside. With this new invention we are able to fill the fittings 100 percent so that there is no part of the fittings that is missed.

SUMMARY

According to the present invention a deflated balloon is inserted through the exposed end of an elongated tubular cavity having an angle fitting on the inner end, and the deflated balloon is passed beyond the far end thereof so that it is hanging inside the main, and inflated to a diameter greater than the angle fitting to hold the balloon thereagainst, then the balloon is deflated and withdrawn back inside the fitting, reinflated therein, and lining material is charged against the balloon to coat the inside of the fitting.

The deflated balloon is inserted by a flexible pusher to bend around inside the angle fitting, and inflated by turning on the pressure into a supply line extending in from the outer end. The balloon, or ball, is inflated while hanging in the gas main and then is drawn back against the tap hole. It is this drawing back against the inside of the main or tap hole that produces the desired tension.

Before the balloon is inserted, the supply pressure thereto is turned on and immediately turned off, the expansion reducing the pressure therein to a lower value which is recorded and the balloon then deflated. After the balloon is inserted and again inflated and expanded against the far end, the expansion pressure is compared to the recorded pressure to verify the desired location of the balloon.

The lining material is contained in a cylinder which follows the flexible pusher, and a higher pressure than that in the balloon is applied to the cylinder to propel the charge therefrom against the balloon and the inside of the fitting. The invention includes the apparatus for practicing the process.

DRAWINGS

DESCRIPTION OF THE PREFERRED EMBODIMENT

Figure 1:
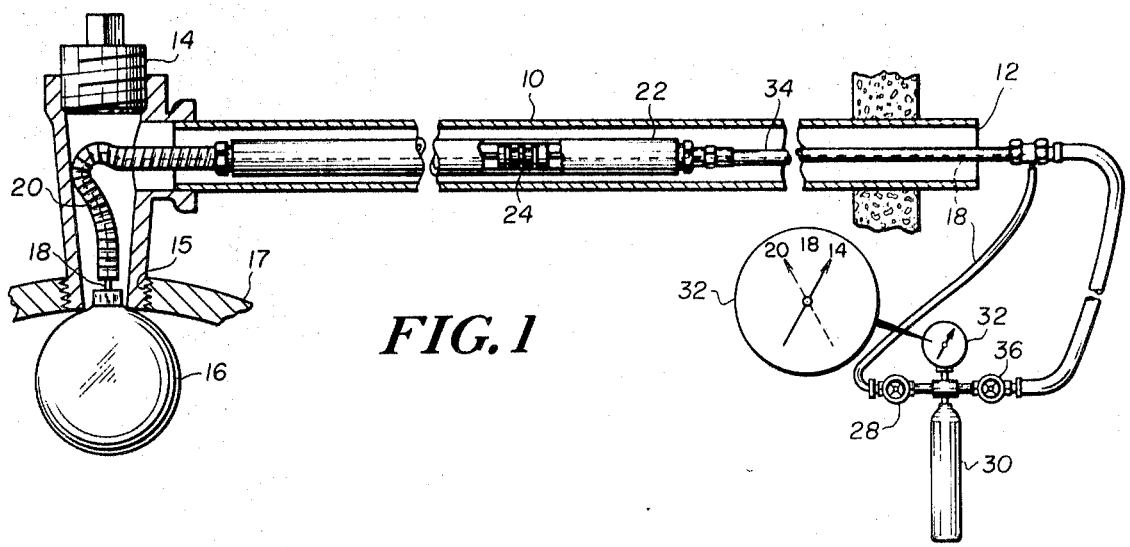
FIG. 1 is a vertical section through a service line and angle fitting for a gas main showing apparatus according to, and for carrying out the method of, the present invention.
Figure 2:
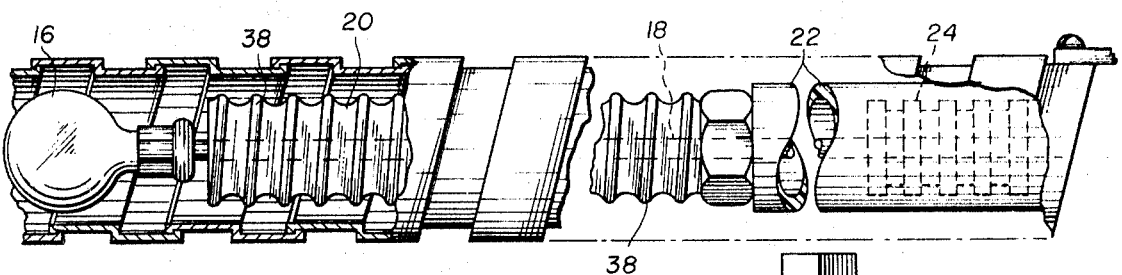
FIG. 2 is an enlarged elevation, partly in vertical section through a portion of the apparatus shown in FIG. 1.

The elongated tubular cavity comprises a gas service line 10 having an open inner end 12 and terminating at the other end in an angle fitting 14 which terminates in a rim 15, the outside of which is threaded into a gas main 17.

The lining apparatus comprises a balloon 16 of tough rubber or the like, which is inflatable by a supply line 18 extending back through a flexible pusher 20 and a cartridge cylinder 22 and through the piston 24 which slides thereover and therealong to expel the material. The line 18 continues on out through the open end 12 and is connected to a pressure board, for example through a valve 28 to a gas bottle 30 having a pressure gauge 32. The inflation pressure line 18 is for example one-eighth inch in diameter.

The liner charging cylinder 22 receives higher pressure for propulsion through an outer line 34 comprising an outer tube of for example three-eighths inch diameter enclosing the inner tube 18 for inflation and connected to a separate high pressure source on the pressure board for example through a separate valve 36.

Figure 3:
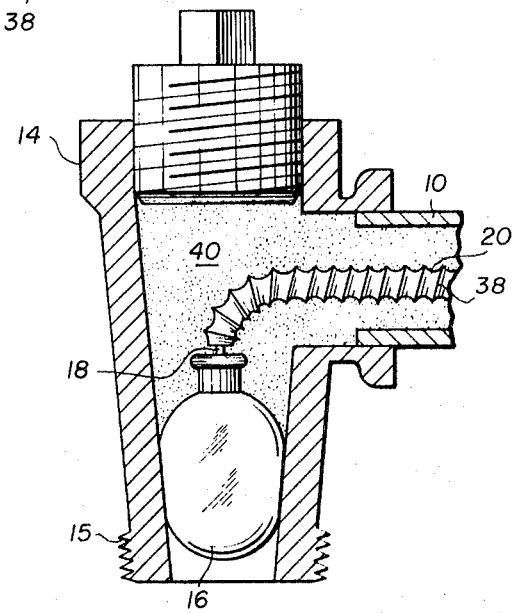
FIG. 3 is an enlarged vertical section through the angle fitting of FIG. 1 showing the charge of lining material applied to the balloon and the inside of the fitting.

The flexible pusher 20 preferably compresses a large plastic tube reinforced by a helical coil 38 of flexible wire. This tube is attached to the discharge end of the cartridge 22 to direct the flow of the material when it is expelled toward the inflated balloon. This tubing is not connected to the balloon but in position as shown in FIG. 3 should be about a half inch above the balloon itself.

In operation, before the apparatus is inserted in the cavity, the valve 28 is turned on to supply pressure to the line 18 from the bottle 30, registered on the gauge 32 at for example 20 p.s.i., and the valve 28 is immediately turned off. The balloon continues to expand and the pressure drops until equilibrium is reached. The reading of the gauge 30 is recorded at for example 14 p.s.i., and the balloon then deflated.

The deflated balloon, flexible pusher 20, line 18 and cylinder 22 containing the lining material such as an epoxy resin composition, are then inserted through the open end 12, and jiggle to flex the pusher 20 to bend around inside the fitting 14 to project the deflated balloon out through the far end 15 thereof. A marker such as a piece of adhesive tape on the line 18 measures the approximate distance to bring the balloon to this desired position.

The valve 26 is again turned on to inflate the balloon and immediately turned off. Because the rubber has already been stretched, the pressure in the unrestrained balloon hanging inside the main as shown in FIG. 1, should be about a pound less than the recorded 14 p.s.i. to equal 13 p.s.i. When the gauge 30 shows this reading it verifies the fact that the balloon is hanging in the main. A higher reading would indicate that the balloon is being restrained somewhere in the fitting, and not in the unrestrained desired position in the main.

The inflated balloon is then pulled back against the rim 15 and deflated. Because the balloon is in its inflated condition, it is held against the inside of the main with some tension, so that when it is deflated, it rises up into the bottom of the fitting. The next step is to inflate the balloon again as shown in FIG. 3. The gauge 30 reading should be about 17 p.s.i. If it is less, the indication is that the balloon is not correctly positioned in the fitting to the restrained position.

The smallest diameter is at the bottom of the tee as shown. If the ball were in the service line or higher in the tee, the gauge would show a higher pressure than in the main, but less than when correctly positioned in the tee.

The valve 36 is now opened to supply high pressure for example 200 p.s.i. through the line 34 to the cylinder 22, to propel the charge of lining material 40 into the angle fitting 14 above the inflated balloon as shown in FIG. 3.

Figure 4:
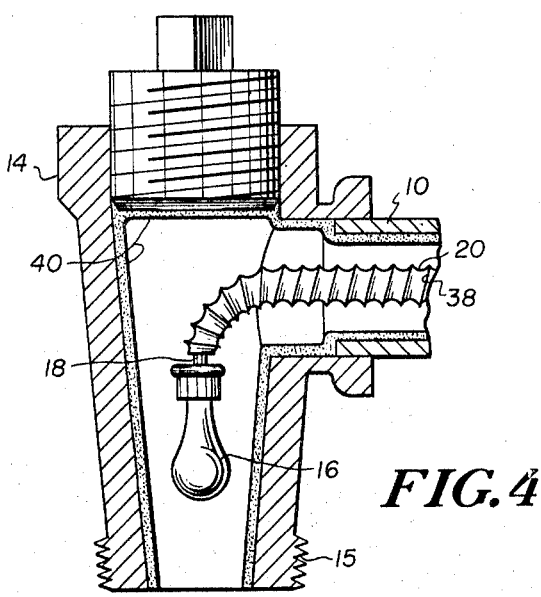
FIG. 4 is a similar view of the completely lined fitting with the balloon deflated.

The final inflation of the balloon establishes a complete plug or cork in the fitting so that when the lining material is propelled it cannot go into the gas main until it fully covers every bit of the fitting involved, as shown in FIG. 4. After a short interval the balloon is deflated as also shown, and the excess material drains into the main.

What I claim is:

1. Method of lining an angle fitting on the inner end of an elongated tubular cavity having the outer end thereof exposed, which comprises inserting through said counter end a deflated balloon, passing said deflated balloon beyond the far end of said angle fitting into a main of relatively large area, inflating said balloon to a diameter greater than said angle fitting and to a pressure indicating the position of the balloon hanging in the main, deflating said balloon and withdrawing the same back inside said angle fitting, reinflating said balloon inside said fitting to hold said balloon thereagainst and to a pressure indicating it position for beginning the lining operation, and charging lining material against said balloon to coat the inside of said fitting.

2. Method as claimed in claim 1, in which said deflated balloon is inserted by a flexible pusher to bend around inside said angle fitting to pass therebeyond, and said deflated balloon is inflated by turning on the pressure into a supply tube therefor extending from said outer end.

3. Method as claimed in claim 1, in which said inserted balloon is first inflated by turning on supply pressure thereto and immediately turning off said pressure, and expansion of said balloon holding the same against the rim of said far end with some tension.

4. Method as claimed in claim 1, in which prior to insertion of said balloon, pusher and tube, the supply pressure thereto is turned on to start inflation thereof and immediately turned off, the expansion reducing the pressure therein to a low value which is recorded and the balloon then deflected, and after insertion when the balloon is again inflated and expanded against the far end, the expansion pressure is compared to the recorded pressure to verify the desired location of the balloon.

5. Method as claimed in claim 1, in which the lining material is contained in a cylinder which follows said flexible pusher, and a higher pressure than that in said balloon is applied to said cylinder to propel the charge therefrom against the balloon and the inside of the fitting.